May 21, 1940.　　　R. E. NEWELL　　　2,201,375
THERMOSTAT
Filed Feb. 12, 1934　　　3 Sheets-Sheet 1
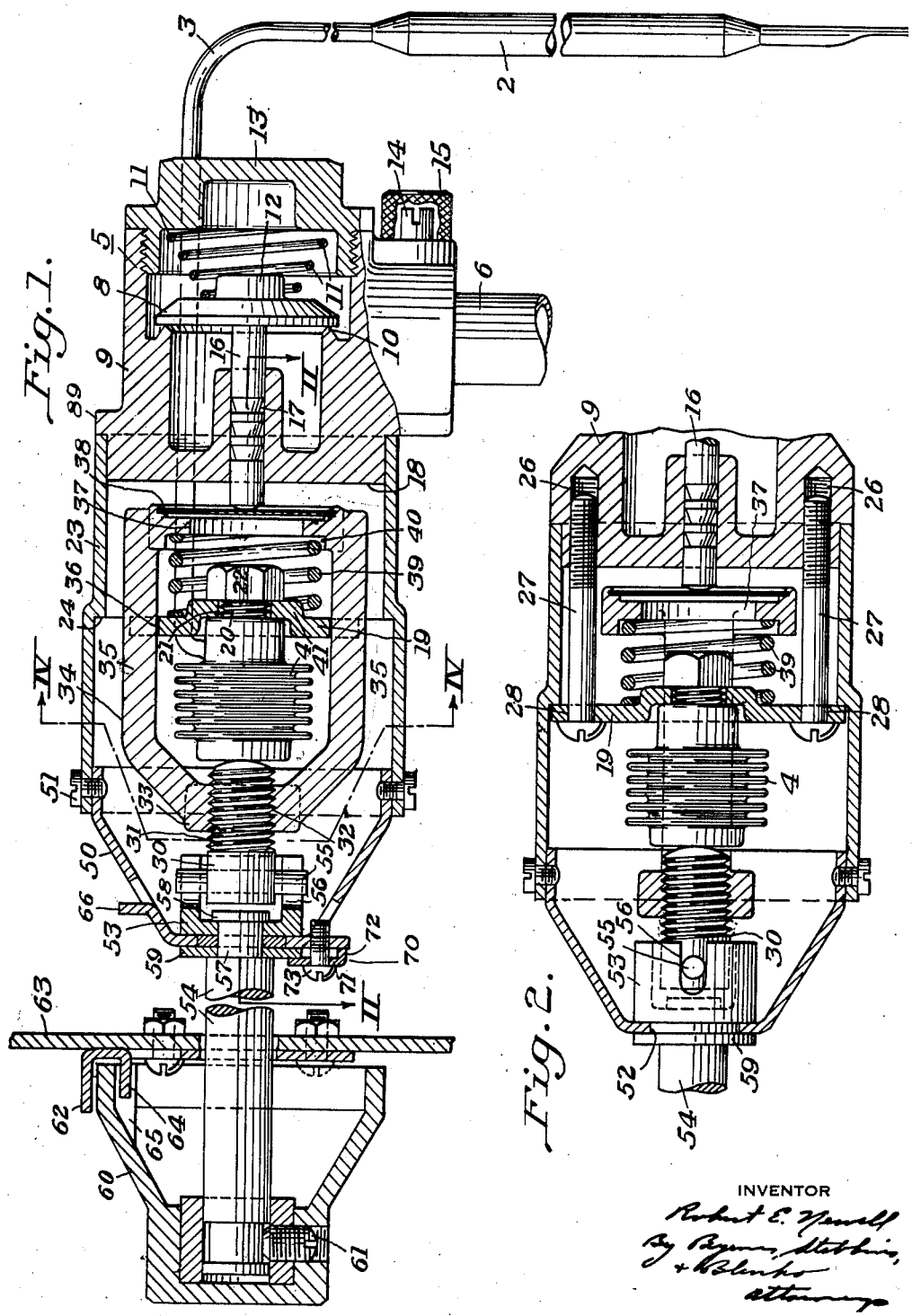

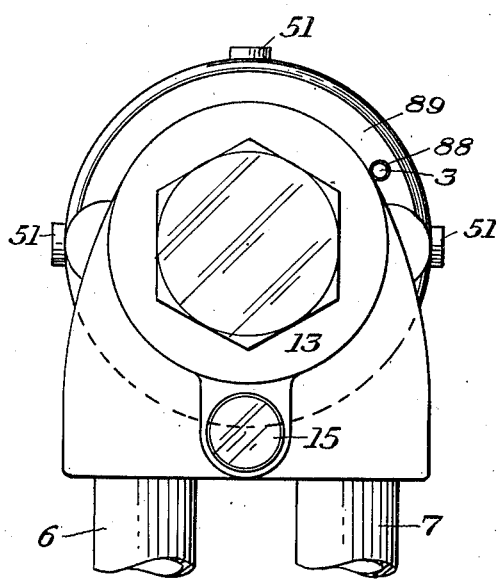
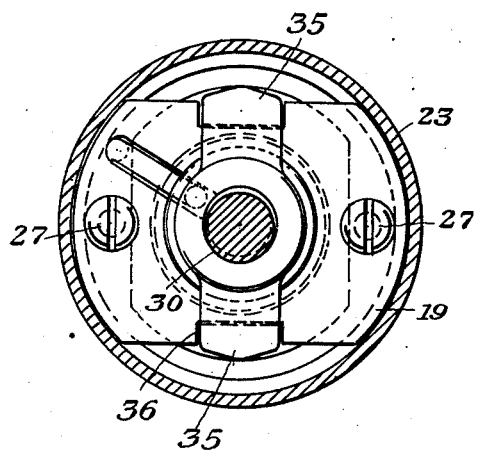
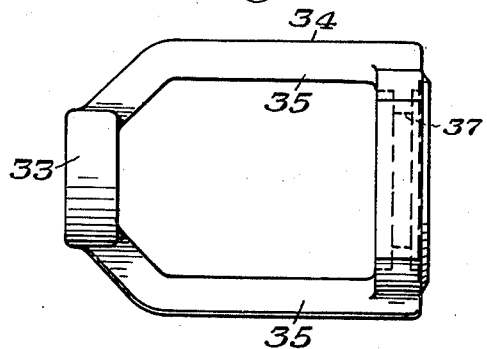
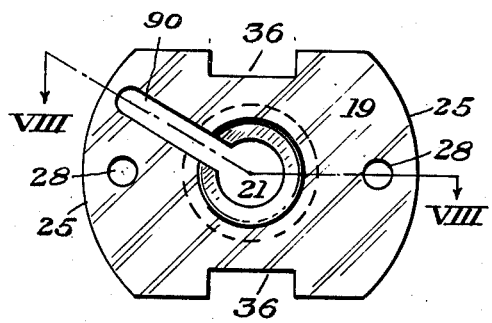
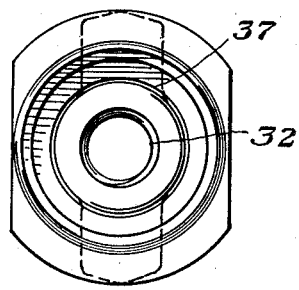
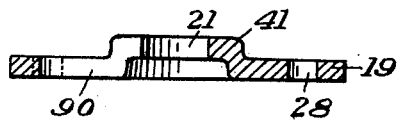

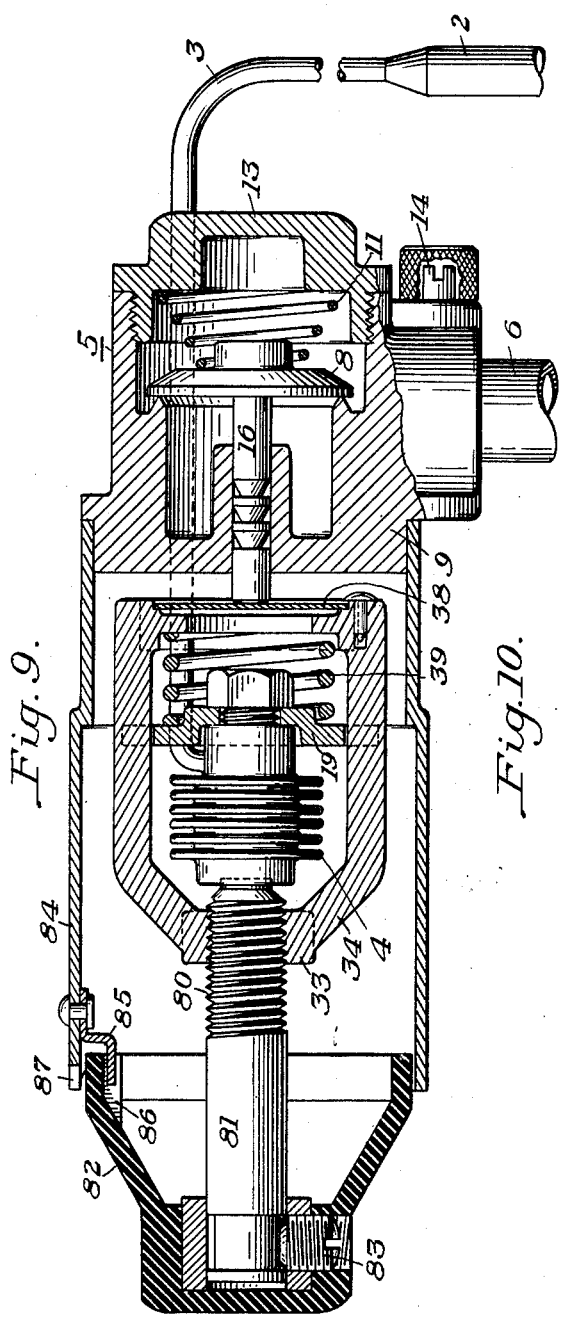

Patented May 21, 1940

2,201,375

UNITED STATES PATENT OFFICE 2,201,375

THERMOSTAT

Robert E. Newell, Irwin, Pa., assignor to Robertshaw Thermostat Company, Youngwood, Pa., a corporation of Pennsylvania Application February 12, 1934, Serial No. 710,847

3 Claims. (Cl. 236—99)

The present invention relates to thermal control and more particularly to thermostats of the bellows type for the purpose of controlling temperatures by effecting control of a controlling element such as a valve, a switch or the like.

By my invention I provide a thermostatic structure of the bellows type which may be used for a large variety of control purposes and which may be readily adapted for installation under widely varying conditions.

The thermostatic structure which I provide by my invention is of the bellows type, having an expansible bellows connected by means of a capillary tube to a bulb, the bulb being located in the medium or chamber the temperature of which is to be controlled. The bulb, the capillary tube and the expansible bellows contain a fluid of an expansible character and which will expand uniformly under widely varying conditions to effect an expansion of the bellows to which the bulb and capillary tube are connected.

The thermostatic structure which I provide may be used for operating control devices of various types and is particularly adaptable for use in connection with the operation of a valve or the like which is adapted to control the flow of a heating fluid for heating the medium or chamber, the temperature of which is to be controlled. My invention is particularly adapted for use in the control of oven temperatures in ranges or the like or for the control of temperatures of mediums which are to be heated, such as the water in ordinary water heaters.

In the drawings, the structure which I provide is not illustrated in connection with any particular device but the constructions shown therein are of such character as to permit them to be readily mounted on a gas range. In such a construction the thermostat will control the operation of the valve for supplying fuel to the oven burner, the bulb being located in the oven. In the co-pending application of R. E. Newell, C. W. Robertshaw and Wm. B. Mackintosh, Serial No. 718,758, filed April 3, 1934, which has now eventuated into Patent No. 1,998,818, a thermostatic device of the bellows type is shown mounted on a gas range and reference is hereby made to said application for a disclosure of an appropriate positioning of a structure such as that provided by my invention in a gas range.

In the drawings I have shown a preferred embodiment of my invention and a modification thereof. It will be understood that my invention is not limited to the particular structures shown in the drawings and that it may be adapted for use in connection with the control of temperatures in devices other than ranges, and, furthermore, may be used for operating control devices other than valves.

In the drawings—

Figure 1 is a vertical sectional view through the structure which I provide and showing it mounted on a valve, the operation of which is to be controlled;

Figure 2 is a sectional view taken on the line II—II of Figure 1;

Figure 3 is a rear elevational view of the structure shown in Figure 1;

Figure 4 is a sectional view taken along the line IV—IV of Figure 1;

Figure 5 is an elevational view of the yoke shown in Figure 1;

Figure 6 is an end elevational view of the yoke shown in Figure 5;

Figure 7 is an elevational view of the base plate shown in Figure 1 on which the bellows is mounted;

Figure 8 is a sectional view along the line VIII—VIII of Figure 7;

Figure 9 is a vertical sectional view through a slightly different embodiment of my invention; and Figure 10 is a top plan view of the embodiment shown in Figure 9.

In the structure which I provide by my invention a bulb 2 is provided which contains an expansible fluid. The bulb 2 is inserted in the chamber or medium, the temperature of which is to be controlled, and the expansible fluid contained therein expands and contracts in accordance with variations in temperature of such medium or chamber. The bulb 2 is connected by means of a capillary tube 3 to an expansible bellows 4. The capillary tube 3, as well as the bellows 4, contains a fluid and expansion or contraction of the fluid in the bulb 2 results in an expansion of the bellows 4.

As stated above, the structures shown in the drawings are adapted for controlling the flow of fluid to a burner or the like. The fluid flow is controlled by means of a valve indicated generally by the reference character 5 having an inlet port 6 and an outlet port 7. A valve member 8 is provided in the valve casing 9 between the inlet and outlet ports and is adapted to cooperate with a seat 10 formed in the valve casing. The valve member 8 is normally forced toward its seat by means of a spring 11, one end of which seats against the valve member 8 around the boss 12 and the other end of which is seated on the valve cap 13. The valve cap 13 is conveniently threaded in the casing so as to permit ready access to the internal portion of the valve.

The valve is provided with a by-pass for supplying a regulated quantity of gas past the main valve at all times for supplying a pilot burner. The size of the by-pass opening is controlled by a by-pass key 14 normally enclosed by means of a cap 15 threaded in the valve casing.

The valve member 8 is operated by means of a valve stem or pin 16 which extends through an opening 17 in the valve casing, the pin 16 projecting a slight distance beyond the face 18 of the valve casing.

The expansible bellows 4 is mounted on a base plate 19. This base plate 19 is substantially circular in general configuration but having two opposite sides thereof formed along parallel chords of the circle. The bellows 4 is provided with a threaded extension 20 adapted to project through an opening 21 centrally located in the base plate 19. A nut 22 is mounted on the threaded stem 20 for rigidly securing the bellows to the base plate 19.

A housing 23, which is substantially cylindrical in shape, is provided for encasing the bellows and bellows assembly for protecting it against dirt, local heat and blows. The housing 23 on its inner circumference is provided with a shoulder 24 extending completely around the housing and against which the circular portions 25 of the base plate 19 abut when the structure is assembled. The face 18 of the valve casing 9 is provided with threaded openings 26 adapted to receive threaded bolts 27. These threaded bolts project through openings 28 in the base plate 19 and are threaded in the openings 26 in the valve casing and rigidly secure the base plate, the housing and the valve casing together.

In thermostatic structures of this character it is necessary, of course, that the control valve close with rising temperatures. If the stationary end of the expansible bellows 4 is remote from the valve body and the movable end closest to the valve body, it is necessary to use a lever or a system of levers to reverse the action of the bellows. If the stationary end of the bellows is adjacent the rear of the valve body and the movable end remote from the bellows, means must be provided for transmitting the movement of the movable end of the bellows around the bellows to the valve or other control means. I have found this latter method to be the most desirable method of mounting the bellows as it eliminates the use of levers and the errors generally incident to structures of this character embodying lever systems. Furthermore, by mounting the bellows in such a manner that the stationary end is closest the rear of the valve body, proper alinement of the bellows and dial with the valve axis may be accomplished and a more much accurate and compact structure obtained.

In the structures illustrated in the drawings it will be apparent that the end of the bellows 4 mounted on the base plate 19 is stationary and the opposite end of the bellows movable. The movement of the forward end of the bellows 4 is transmitted to the pin or valve stem 16 by the structure which will now be described. This mechanism also transmits adjustments from the adjusting dial, to be later described, to the valve stem.

The forward end of the bellows 4 abuts against one end of an adjusting screw 30. The adjusting screw 30 is provided with a threaded portion 31 adapted to cooperate with a threaded opening 32 in the head 33 of a yoke 34. This yoke is provided with oppositely disposed arms 35 which extend around the bellows and pass through recessed portions 36 in the base plate 19. The lower end of the yoke 34 is substantially circular and is provided with a centrally disposed opening 37. A disc or plate 38 is mounted in recesses in the circular portion of the yoke 34 adjacent the opening 37. This disc 38 is preferably of bi-metal for the purpose of compensating local temperatures to which the bellows assembly is subjected. This compensating feature will be more fully described hereinafter.

A compression spring 39 is mounted in the yoke 34, one end thereof being mounted on a seat 40 formed in the circular base portion of the yoke. The other end of the compression spring 39 bears against the base plate 19 and is held in position by a boss 41 on the one face of the base plate.

The plate 38 bears against the pin or valve stem 16 and movement of the bellows and the yoke 34 is transmitted to the valve member 8 through the plate 38 and the pin 16.

As can be readily seen from the above description, expansion of the bellows 4 will cause the screw 30 to move to the left as viewed in Figure 1 and the screw will carry the yoke in the same direction and also the plate 38, thereby permitting the spring 11 to force the valve member 8 toward its seat. Contraction of the bellows 4 will cause the yoke and the plate 38 carried thereby to move in the opposite direction, thereby forcing the valve 8 away from its seat. Where the expansion of the bellows 4 is occasioned by local heat not affecting the bulb 2, the bi-metal compensating disc 38 will be subjected to similar temperatures and will compensate for such temperatures and the expansion of the bellows will, therefore, not be transmitted to the valve member. Where the structure is to be mounted in a position where there is little or no likelihood of it being subjected to great temperature changes, the bi-metal plate or disc 38 may be replaced by a plate which will not compensate for local heat.

In structures of this character, it is desirable to provide means for adjusting the assembly to respond to desired temperatures so that the valve will open and close at appropriate times to maintain a given temperature in the medium or chamber, the temperature of which is being controlled. In the drawings I have shown two different arrangements of adjusting mechanism which may be used for adjusting the structure to operate at the desired temperature.

In the structures shown in Figures 1, 2 and 3, the front part of the housing 23 is closed by a cap 50 which is suitably secured to the housing 23 by screws 51. The cap 50 is provided with an opening 52 in the forward end thereof, which opening is adapted to receive and support the connecting block 53 for effecting a connection between the adjusting screw 30 and the adjusting stem 54. The adjusting screw 30 carries a pin 55 arranged to cooperate with slots 56 in the connecting block 53. This pin 55 is rigidly secured to the adjusting screw 30 and cooperates with the slots in the connecting block 53 in such manner as to transmit rotary motion from the connecting block 53 to the adjusting screw 30 but to not transmit horizontal movement of the adjusting screw 30 occasioned by the expansion of the bellows to the connecting block 53.

The adjusting stem 54 has a reduced portion 57 which extends into the connecting block 53. The reduced portion 57 is provided with a head 58 to prevent the stem 54 from becoming disengaged from the connecting block. A washer 59 is mounted on the reduced portion 57 of the adjusting stem 54 between the shoulder on the adjusting stem and the forward end of the cap 50.

The adjusting stem 54 is provided with an adjusting dial 60 at the forward end thereof, the adjusting dial 60 being rigidly secured to the stem 54 by means of a set screw 61. Suitable indicia may be provided on the dial 60 to cooperate with a pointer 62 mounted on the panel 63 which may be the front panel of a stove or the like. A stop finger 64 is also provided to cooperate with a stop member 65 carried by the adjusting dial to prevent rotation thereof through more than 360°.

When a short dial stem is used, a stop 66 formed on the cap of the bellows housing may be used as a stop for the dial. The pointer in such a case would be marked on the front of the panel. When a long stem is used, a separate stop and pointer such as above described is screwed to the front panel of a stove.

In cases where it is necessary to remove the dial in order to install the structure, a locking device 70 may be installed. This locking device consists of a washer 71 having a heel 72 thereon and a clamping screw 73 which is arranged to grip the washer which extends from the dial stem. This latter washer is riveted tightly so that it will not rotate except with the stem. In shipping, the structure would be locked at a particular temperature, say 400°, and when installing the device the customer would loosen the locking device. The dial, of course, would then be set with the 400° mark opposite the pointer and the device would then be in proper calibration.

The tang connection described above is of particular advantage in structures of this character in view of the fact that the movement of the bellows is not imparted to the adjusting dial. Without a connection of this character the movement of the bellows would be transmitted to the dial and it would move forwardly and rearwardly to a slight extent. The amount of movement of the dial where a direct connection is effected between the yoke and the adjusting dial is rather slight and does not constitute a draw-back in operation, although some users do prefer a structure wherein the dial is fixed.

In the construction shown in Figures 9 and 10, the bellows assembly, the valve construction and the operating parts, with the exception of the arrangement of the adjusting dial, are the same as in the construction shown in Figures 1 to 8 inclusive. In this construction there is no tang connection between the threaded portion 80 of the adjusting stem 81 and that portion of the stem carrying the adjusting dial. The adjusting dial 82 is rigidly secured to the forward end of the adjusting stem 81 by means of a set screw 83. The forward end of the casing 84 enclosing the bellows assembly is closed by the adjusting dial 82 and no additional cap, such as the cap 50 shown in Figures 1 and 2, is necessary. A stop clip 85 is mounted on the inner circumference of the housing 84 and cooperates with the stop 86 carried by the adjusting dial to prevent excessive rotation of the adjusting dial. A pointer 87 is formed directly on the adjusting dial 82 for cooperation with suitable indicia carried by the adjusting dial.

In both the constructions shown in the drawings, the capillary tube 3 enters the housing for the bellows assembly through a suitable opening 88 in the flange 89 of the valve casing 9. An opening 90 is provided in the base plate 19 to permit the capillary tube 3 to pass therethrough.

A housing of the character shown in the drawings, and particularly in Figures 9 and 10, is highly advantageous. It forms a pointer or indicator at its outer end; it carries a stop clip which must always be at a relative angle or position with respect to the pointer; and it effectually protects the internal mechanism from dirt or damage by accidental blows. It also serves to protect the bellows and the operating parts from direct contact with hot gases from adjacent burners, such as the hot top burners of a range. It also protects the dial which moves in and out with the bellows and prevents it from binding upon any wall or panel through which it may be inserted.

It will be understood, of course, that any type of valve body may be used without altering the general design of the thermostatic unit. If desired, a switch mechanism, or any other type of control, may be substituted for the valve. The structure which I provide is of such character as to permit the positioning of the bellows element where it will not be subjected to the action of the gas or other heating fluid. There are certain well defined limits on the character of materials which can be used for such bellows and practically all of the metals which have been found suitable for manufacturing such structures are susceptible to corrosion in a sulphurous gas atmosphere. The structure which I provide is highly advantageous therefore over the prior art structure, wherein the bellows is located in the path of the heating medium.

I have found that when the bellows is located so as to be not subjected to the heating medium, it is desirable to provide a compensating element for compensating local heat, said compensating element being also located outside the path of the heating medium and as near as possible to the bellows, so that the bi-metal compensating element and the bellows will be simultaneously affected by local heat and to substantially the same extent. It will be apparent that I have provided a structure of this character, wherein both the bellows and the compensating element are positioned closely together and out of the path of the heating medium. I have found in actual practice that by so arranging the bellows and the compensating element, it is possible to limit errors to within 5 to 8° F. in a total of 500° F. oven temperature with an increased local temperature around the bellows of approximately 250° F. If it were necessary or even desirable to eliminate even this slight error, it could be done in a structure such as that above described, as response to local heat by the bi-metal element is practically instantaneous.

It will be understood, of course, that the bi-metal element is not an essential element in a structure of this character where the structure is located so as not to be subjected to local heat.

A structure such as that which I provide is highly desirable in that it obviates the possibility of any of the parts binding or sticking at any time. Furthermore, no lubrication whatever is necessary during the life of the structure. The adjusting screw does not act as a gas seal in the structure which I provide and, consequently, there is no possibility of the adjusting screw itself sticking or binding.

Another advantage of the structure which I provide which has not heretofore been pointed out is that the structure will continue to operate and operate satisfactorily even though the bi-metal compensating element fails. The structure will continue to operate, the only loss being that it will not effect a compensation for local heat. The chances of failure in the bi-metal element used in my structure are rather remote, as it is located without the gas passage and, consequently, is subjected to no corrosive action whatever by the gas.

Another particular advantage of the structure which I provide resides in the flexibility thereof. The adjusting screw in the casing may be extended to any desired length in order to permit location in a range in the most desirable and most feasible position. Furthermore, the casing itself need not be extended in order to give a greater distance between the adjusting dial and the valve, for a suitable cap can be placed over the front end of the casing and the adjusting screw extended to any desired length and the dial positioned at the most convenient location. It will be understood, of course, that various types of connections between the adjusting dial and the yoke may be utilized.

While I have pointed out a number of the advantages in my improved thermostatic structure, other advantages will be apparent to those skilled in the art.

While I have shown and described a preferred embodiment and one slight modification of my device, it will be understood that I do not intend to be limited thereby as my invention may be otherwise embodied within the scope of the appended claims.

I claim:

1. A thermostatic structure comprising control means, a bellows assembly for operating said control means, means for supporting said bellows assembly, said bellows assembly including a yoke extending at least partially around said bellows and arranged to be actuated by the movable end of said bellows and means connected with said yoke for transmitting movement thereof to said control means, adjusting means including an adjusting dial carried by the bellows assembly for adjusting the yoke relative to the bellows, and bi-metallic means carried by said bellows assembly between the bellows and said control means and arranged to compensate temperatures to which the bellows assembly is subjected.

2. A thermostatic structure comprising a valve casing having a gas passage therethrough and a valve member therein for controlling the flow of gas therethrough, a bellows assembly for operating said valve member, said bellows assembly being located externally of said valve casing and out of contact with gas passing therethrough, adjusting means including a dial carried by the bellows assembly for adjusting the valve relative to the bellows assembly, means for transmitting motion from said bellows assembly to said valve member, and compensating means located externally of said valve casing and out of contact with gas passing therethrough and between said bellows assembly and said valve member, said compensating means being arranged to compensate for temperatures to which the bellows assembly is subjected, by altering the position of the valve disc with respect to the movable end of the bellows.

3. A thermostatic structure comprising control means, an expansible bellows, a casing for said bellows, means for rigidly securing one end of said bellows within said casing, including a transversely extending plate to which the bellows is secured, a yoke extending around said bellows and arranged to transmit movement of the free end of said bellows therearound, a spring extending between one end of said yoke and said transverse plate for supporting said yoke and maintaining it in operative connection with said bellows, means cooperating with said yoke for transmitting movement of the yoke to said control means, means including an adjusting dial carried by the yoke and bellows for adjusting said yoke relative to the free end of said bellows, and compensating means between said yoke and said control means and carried by the bellows assembly for compensating temperatures to which the bellows is subjected.

ROBERT E. NEWELL.